Oct. 20, 1931.  R. L. PARK  1,828,437
BEAN HARVESTER
Filed Feb. 2, 1931   4 Sheets-Sheet 1
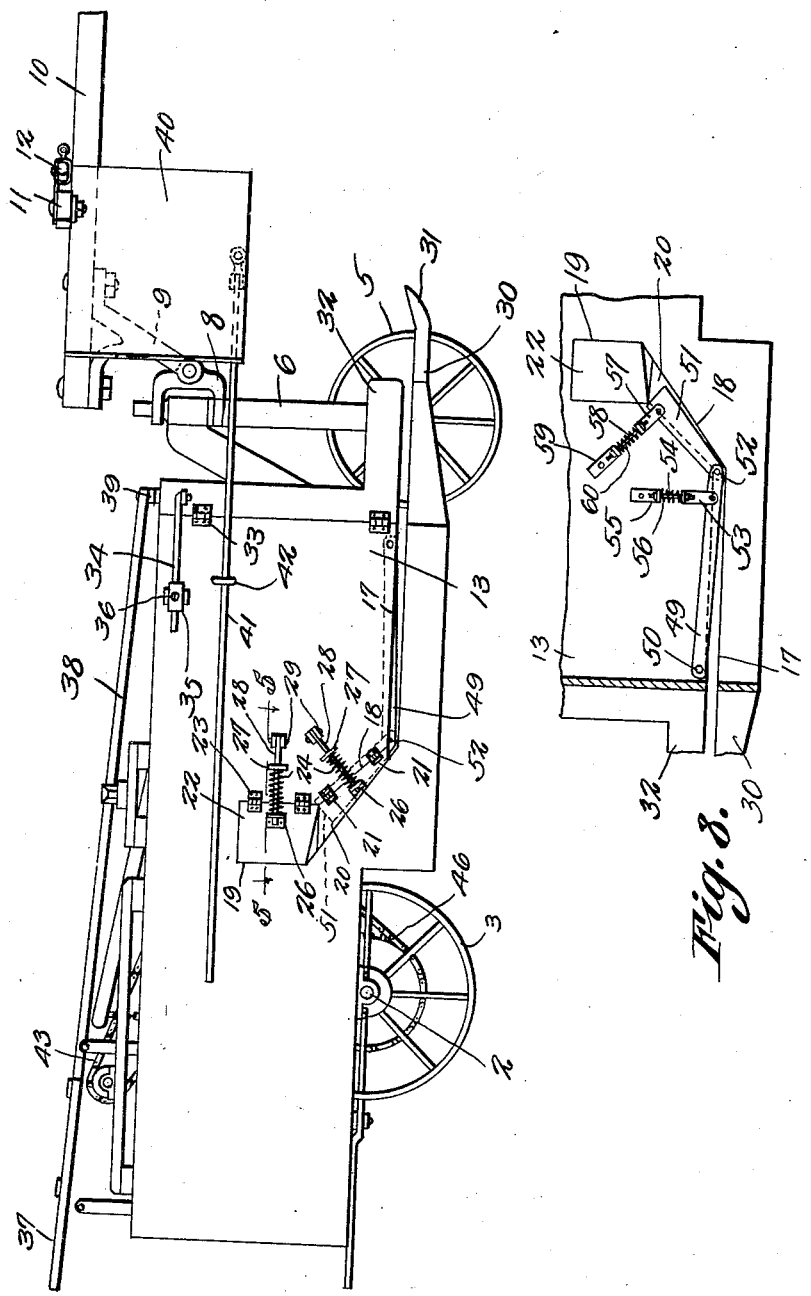
Inventor
R. L. Park
By C. A. Snow & Co.
Attorneys.

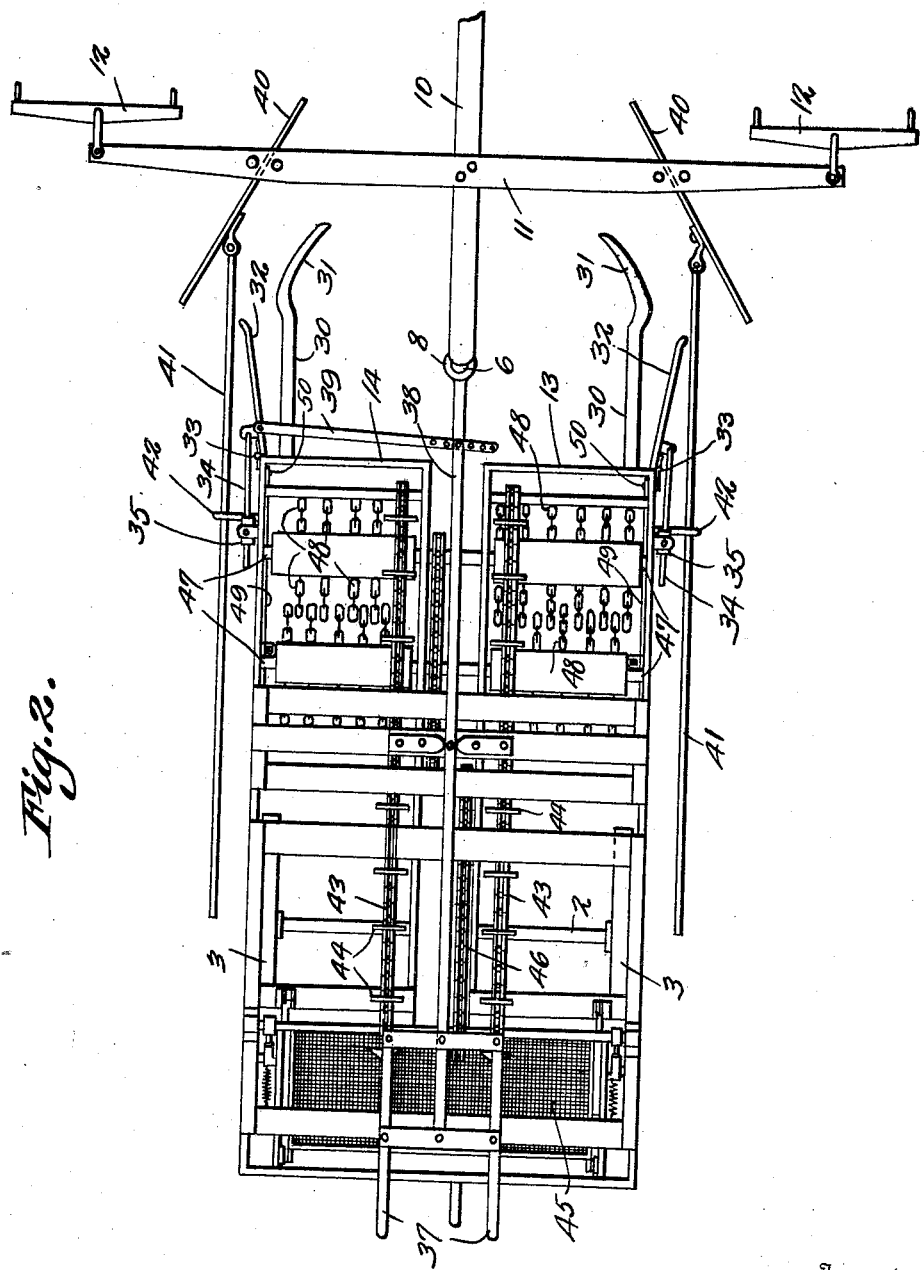

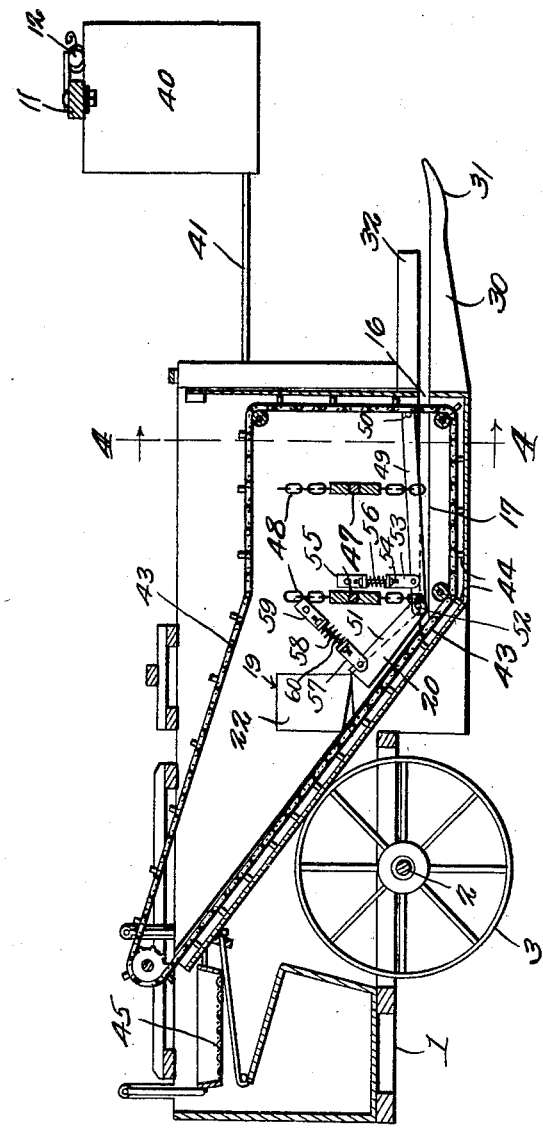

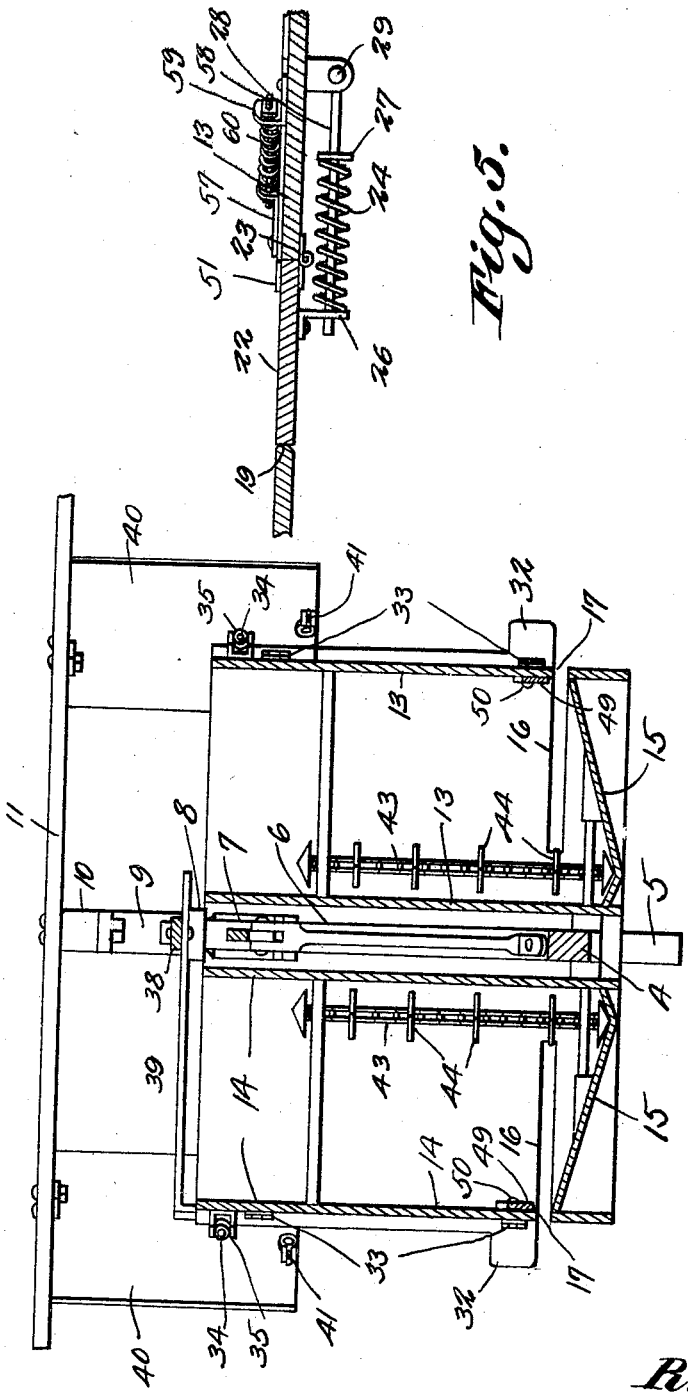

Patented Oct. 20, 1931

1,828,437

UNITED STATES PATENT OFFICE

ROBERT LEE PARK, OF DARDEN, TENNESSEE

BEAN HARVESTER

Application filed February 2, 1931. Serial No. 513,968.

This invention relates to a machine for harvesting beans and it is more especially an improvement upon the structure disclosed in Patent No. 1,776,129, issued to me on September 16, 1930, and in my application for reissue of said patent, filed January 29, 1931, Serial Number 512,326.

It is an object of the invention to provide a means whereby the beans, during the thrashing operation, will be retained in the machine and not scattered over the ground and wasted.

A further object is to provide the machine with means for deflecting standing corn out of the path of the machine so that beans, planted in the same row therewith, can be directed into the machine without being interfered with by the corn.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred form of the invention has been shown.

In said drawings:

Figure 1 is a side elevation of the harvesting machine constituting the present invention.

Figure 2 is a plan view.

Figure 3 is a vertical longitudinal section.

Figure 4 is a section on line 4—4, Figure 3.

Figure 5 is an enlarged section through one of the doors of the machine taken on line 5—5, Figure 1.

Figure 6 is a diagram showing a row of corn and beans prior to being acted on by the machine.

Figure 7 is a diagram showing the action of a portion of the machine in deflecting the standing corn stalks in one direction while the advancing machine is deflecting the bean plants in the opposite direction.

Figure 8 is an elevation of the inner side of one of the walls of a housing showing the pressure device thereon.

Referring to the figures by characters of reference, 1 designates a frame mounted on an axle 2 supported by wheels 3 and this frame has a central beam 4 at the front end of which is arranged a supporting wheel 5. A stem 6 is extended upwardly from the forward end of beam 4 and mounted in a brace 7. On this stem is mounted a yoke 8 to which is hingedly connected a bracket 9 attached to the rear end of a draft beam 10. A cross beam 11 is attached to the draft beam and carries singletrees 12 whereby draft animals may be connected to the machine although it is to be understood that under some conditions these parts may be eliminated and the machine coupled in any suitable manner to a tractor or the like.

The frame 1 carries laterally spaced housings 13 and 14 each of which has its bottom in the form of a trough 15 extended throughout the width of the housing. An inlet opening 16 is provided in the front wall of each housing and extends to the outer side thereof where it merges into a side opening 17 which extends backwardly and merges into a gradually widening opening 18 which is inclined upwardly and rearwardly and terminates in an upwardly extended portion 19.

A door 20 is hingedly connected at 21 to each housing, 13 and 14, and another door 22 is hingedly connected at 23 to said housings. These doors are normally seated in the extensions 18 and 19 of each opening 17 and are held in normal positions by springs 24. As shown in Figure 5, each of these springs bears at one end against a bracket 26 secured to the outer side of the door while the other end of the spring bears against a collar 27 or the like carried by a rod 28 which is hingedly connected to the outer side of the housing. The spring holds its door yieldingly closed but when the door is pressed outwardly from within it will act to compress the spring.

Extending from the forward end of each of the housings 13 and 14 below the openings 16 and 17 is a gathering finger 30 fixedly mounted and having its forward end obliquely disposed so that said ends of the two fingers will converge forwardly as shown at 31.

Hingedly connected to the outer side of each housing at the forward end thereof and above the openings 16 and 17, is a deflecting blade 32. The hinges of this blade have been indicated at 33. To the outer side of the blade is pivotally connected a rod 34 and this is slidably mounted in a sleeve 35 secured to the side of the housings. By means of a set screw 36 the rod 34 can be held against sliding movement so that the deflecting blade 32 will thus be held at any desired angle relative to the gathering finger 30.

Handles 37 are connected to the back end of an elongated lever 38 and to this lever is pivotally attached a link 39 the outer end of which can be detachably and pivotally connected to either of the blades 32. By shifting the handles 37 laterally the blade 32 connected thereto can be adjusted angularly about its hinge connections 33 so as to be presented at any desired angle to the row of plants being acted on.

Secured to the cross beam 11 are depending deflecting blades 40 to the outer sides of which are attached rearwardly extending rods 41 mounted in laterally extending loops 42 on the respective housings 13 and 14. These blades 40 and their rods 41 are located above the tops of the bean plants to be acted on but below the tops of standing corn growing in the same row with the beans. The purpose of this will be hereinafter explained.

In each housing 13 and 14 there is arranged an endless conveyor 43 having blades 44 adapted to scrape along the lower portion of the adjacent trough-like bottom 15. The bottom of each housing is inclined upwardly and rearwardly along the extension 18 of opening 17 and thence upwardly to a point where material dragged therealong will be deposited on a screen 45. Motion may be transmitted to the conveyor by chain and sprocket mechanism indicated generally at 46 and driven by the axle 2.

The chain and sprocket mechanism can also be employed for the purpose of driving transverse beater shafts 47 located in the housings 13 and 14 above the trough-like bottoms 15. Each of these shafts has short chains 48 extending therefrom and constituting beaters.

In practice the machine herein described is adapted to be moved along side of a row in which corn c and beans b are growing, as shown in Figure 6. The deflecting blades at the side of the machine nearest the row are placed at such angles that blade 40 will come against the upper portion of the standing corn and deflect it laterally from the path of the machine where it will be held by the rod 41 until the front portion of the machine has passed. See Figure 7. As soon as the corn has been pushed laterally as explained, the deflecting blade 32 will come against the bean plants b and deflect them into the path of the machine and over finger 30 so that their upper portions will be held substantially horizontal and enter the openings 17 and 16. While the tops of the bean plants are thus supported in one of the housings 13 or 14, the rotary beaters will thrash the beans therefrom and as the machine continues to advance the plants will be pulled from the housing successively. This withdrawal of the plants will take place at the extensions 18 and 19 of opening 17 and the doors 20 and 22 will swing open under the action of the plants but will act at all times to prevent the beans from being discharged by the beaters through the outlet openings from which the doors have moved.

In view of the foregoing action, no waste of beans will occur. Instead, the beans will gravitate to the bottom 15 of the housing and there be gathered and carried by the conveyor to the separating screen 45.

For the purpose of pressing down on the plants so as to hold the upper portions thereof substantially horizontal while in the machine, a pressure device, if desired, can be used along each side opening 17. Each device includes a strip 49 pivotally mounted at its front end above the inner side of opening 17, as shown at 50. An extension strip 51 is pivotally connected at 52 to the rear end of strip 49. The rear end portion of strip 51 has a bracket 53 connected by a rod 54 to a fixed bracket 55. A spring 65 is carried by the rod and presses against both brackets so as to hold the strip 49 yieldingly in a downwardly and rearwardly inclined position across opening 17.

Another bracket 57 is secured to the rear end portion of extension strip 51 and is connected by a rod 58 to a fixed bracket 59. A spring 60 is mounted on the rod and thrusts against both brackets to hold strip 51 normally across the opening 18 with its lower edge inclined.

From the foregoing it will be apparent that when the upper portions of the plants are received in opening 17 and as the machine advances, the strips 49 and 51 will press downwardly on the plants and hold the upper portions in laterally bent positions where they can be engaged properly by the flexible thrashing elements.

It is to be understood that the deflecting blades can be arranged at any angles necessary to properly act on the plants in the paths thereof. Furthermore, while the machine has been described as acting on one row only, at one time, it is to be understood that two rows can be acted on at once if so desired.

What is claimed is:

1. In a bean harvester the combination with a portable housing having front and side inlet openings and a closure for a portion of the side opening, of thrashing means within the housing, and means for deflecting bean plants laterally into the front and side openings for ultimate engagement with the closure to open it.

2. In a bean harvester the combination with a portable housing having front and side inlet openings, of means operated by the movement of the machine along a row of bean plants for deflecting the tops of the plants laterally to enter the openings in substantially horizontal positions, means within the housing for thrashing the tops supported therein, each side opening having an enlarged portion constituting an exit for the tops of thrashed plants, and means within the exit for preventing escape of thrashed beans therethrough.

3. In a bean harvester the combination with a portable housing having front and side inlet openings, of means operated by the movement of the machine along a row of bean plants for deflecting the tops of the plants laterally to enter the openings in substantially horizontal positions, means within the housing for thrashing the tops supported therein, each side opening having an enlarged portion constituting an exit for the tops of thrashed plants, and means within the exit for preventing escape of thrashed beans therethrough, said means including a closure and means for holding the closure yieldingly in shut position.

4. A bean harvester including a portable housing having front and side inlet openings, means movable with the housing for deflecting plants of one height in a row laterally from the path of the machine, and means movable with the machine for deflecting the tops of plants of lesser heights in said row laterally and into the openings in the housing.

5. A bean harvester including a portable housing having front and side inlet openings, bean thrashing means within the housing, and superposed separating means movable with the housing for engaging plants of different heights respectively to deflect plants of one height laterally from the machine and the plants of lesser heights laterally into the openings for engagement by the thrashing means.

6. In a bean harvester the combination with a portable housing having front and side inlet openings and a closure for a portion of the side opening, of thrashing means within the housing, means for deflecting bean plants laterally into the front and side openings for ultimate engagement with the closure to open it, and yielding means in the housing for exerting a downward pressure upon the plants extending into the housing.

7. In a bean harvester the combination with a portable housing having front and side inlet openings and a closure for a portion of the side opening, of thrashing means within the housing, means for deflecting bean plants laterally into the front and side openings for ultimate engagement with the closure to open it, and yielding means in the housing for exerting a downward pressure upon the plants extending into the housing, said means including a pivoted strip at the inner side of the side opening, and a spring for holding the strip normally in a predetermined position, said strip and the bottom edge of the side opening normally converging rearwardly.

In testimony that I claim the foregoing as my own, I have hereto affixed my signature.

ROBERT LEE PARK.